United States Patent [19]

Kulik

[11] 4,149,860

[45] Apr. 17, 1979

[54] GAS LIQUID SEPARATOR

[76] Inventor: Donald A. Kulik, 65 High Park Ave., Ste. 1505, Toronto, Ontario, Canada, M6P 2R7

[21] Appl. No.: 912,298

[22] Filed: Jun. 5, 1978

[51] Int. Cl.² .............................................. B01D 19/00
[52] U.S. Cl. ........................................ 55/159; 55/193; 55/206
[58] Field of Search .................... 55/52, 55, 159, 192, 55/193, 199, 201, 206; 210/512

[56] References Cited

U.S. PATENT DOCUMENTS

| 2,413,102 | 12/1946 | Ebert et al. .......................... 55/52 X |
| 2,509,267 | 5/1950 | Goodwin ............................ 55/55 X |
| 2,540,390 | 2/1951 | Gorgerat et al. ...................... 55/192 |
| 3,795,088 | 3/1974 | Esmond ................................ 55/206 |
| 3,834,124 | 9/1974 | Ichikawa ............................. 55/159 |

*Primary Examiner*—Thomas G. Wyse
*Assistant Examiner*—Richard W. Burks

[57] ABSTRACT

The specification describes a gas-liquid separator which is compartmentalized for eliminating high speed streams of gas-carrying liquid. These compartments in combination with anti-vortex and liquid flow path impeding means reduce the liquid flow speed and turbulence in the liquid to effect the separation of the gas from the liquid. The separator is provided with a liquid outlet and a separate venting means for the escape of the separated gas.

13 Claims, 8 Drawing Figures

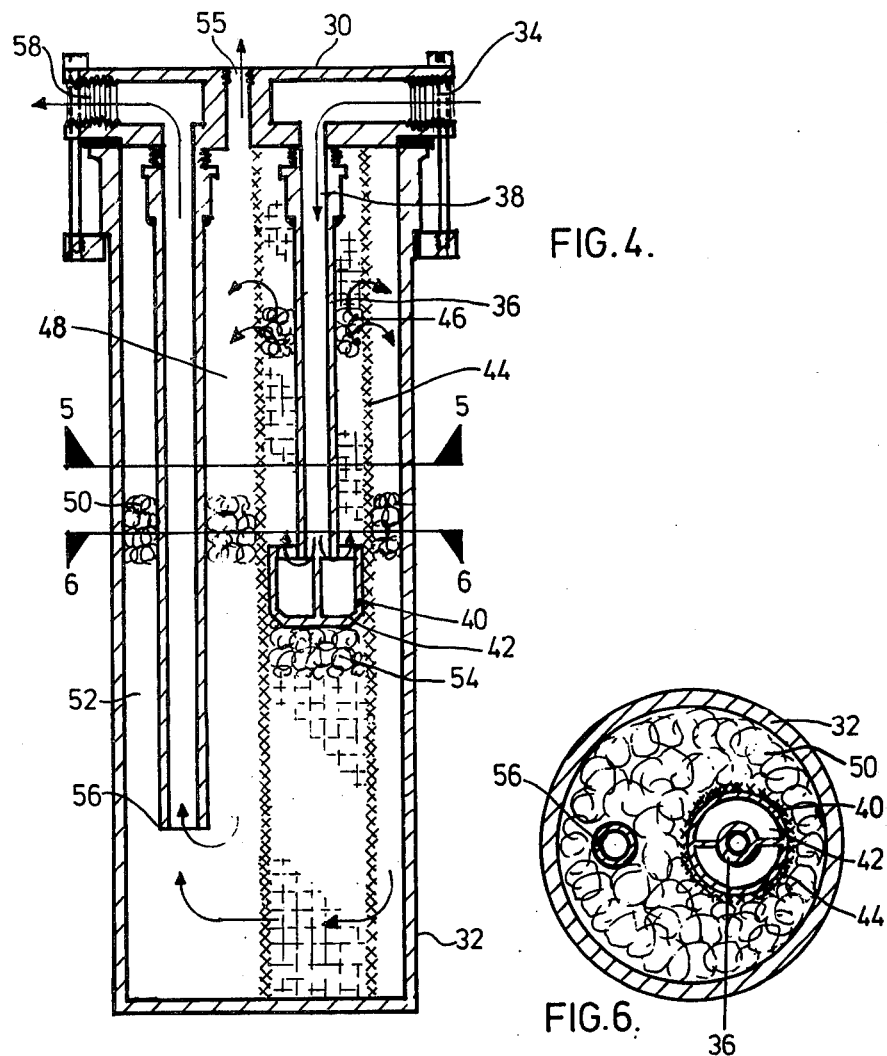
FIG. 4.
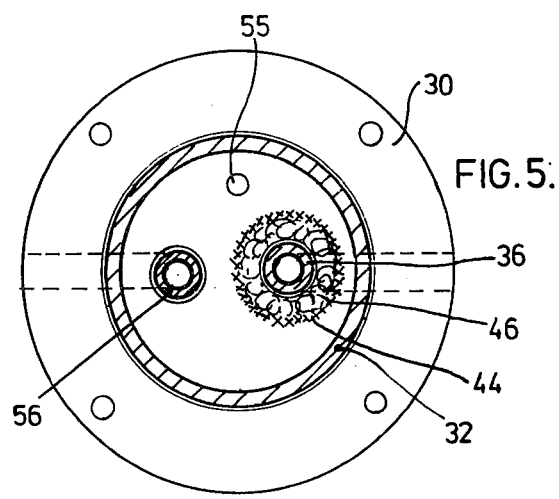
FIG. 6.
FIG. 5.

GAS LIQUID SEPARATOR

FIELD OF THE INVENTION

This invention relates to gas-liquid separators.

BACKGROUND OF THE INVENTION

The presence of gas or air bubbles in most systems employing flowing liquids is highly undesirable. A particular system of this category is a closed hot water heating system in which the gas, in the form of air bubbles flowing with the water, significantly reduces the efficiency of the system. For example, large commercial buildings generally operate on a border line near the upper limits of what is referred to as a critical condition where there is a need to operate a boiler at a higher temperature than would be required if the gas were not present in the system in order to off-set cold areas resulting from poor liquid circulation and heat exchange. Most buildings as a result of poor design layout of the circuits have particular areas which act as air traps and affect the circulation throughout the entire building. Furthermore, because oxygen is one of the prime causes of rapid corrosion, the air bubbles produce extreme corrosion build-ups at one or more locations along the circuit which provide undesirable restrictions in the pipelines.

The heat exchange properties of the system are dependent on the cleanliness or purity of the water in the system. Most of the elements common to the water can be controlled by chemicals to reduce the rate of corrosive attack. However, the oxygen is the most prominent promoter of electro-chemical activity and therefore, should be reduced or removed from the system.

To further enhance the difficulty, heat when directed at a water containing conduit, will bring about a release of gas bubbles in the flowing medium. These bubbles are in the form of steam and other gases which generally do not condense back to a liquid form although this is dependent on the weight of the converted liquid and the operating temperature which is usually sufficiently high throughout the entire circuit to maintain the gaseous bubbles. The gas behaves in the same manner as does the air in the system in terms of flow restriction, reduced heat transfer and corrosive activity.

The corrosion itself is primarily an electrochemical action which includes the removal of metal from one point in the pipe system and the depositing of the metal along other points of the system. The loss of metal from the first point ultimately results in ruptures of leakages. The deposit at other points results in progressive build-ups and ultimate blockages. Again oxygen is the most prominent agent resulting in the corrosion and should therefore be eliminated as much as possible from the flow. Most systems include local air venting means, however, these are only effective against trapped air and are not effective against the air bubbles which are actually flowing with the water. Therefore, such venting only occurs after there has been a total air blockage in the system and in cases where the amount of air in the system is not sufficient to close off an area, its detrimental effects may not be appreciated although they do exist. This results in unrealized wastage of fuel and poor heat transfer conditions relative to a system in which air is not present.

The air in the system also produces hardships on the pumping means by reducing flow velocity and continuity. From the one end of the system the pump is attempting to force the weight of the water up and over the highest point in the system and from the other end of this system the pump is attempting to pull the water downwardly with the assistance of gravity. However, such pushing and pulling is adversely effected by the stretching of the air in the water. In an air-free circuit the water behaves as an interlocked chain and experiences no such stretching effect. However, this condition rarely exists in practice.

Attempts have been made in the past to provide air gas separators such as that described in Canadian Pat. No. 965,357, issued Apr. 1, 1975. However, these attempts are based on providing a vortex in the fluid passing through the separator to throw the heavier water to the outside as a vortex, thereby separating the gas from the liquid. However, due to the unpredictability of air bubble behavior in a flowing liquid medium such vortex systems are very difficult to control. They are dependent upon flow speeds and vortex force. For instance a vortex separator will not work where the flow speed is not high enough to provide a sufficiently strong vortex to throw the water to the outside. Nor will it work if the flow speed is excessively high because the air bubbles, which may be microscopic in size, do not flow with the liquid medium at flow speeds beyond a certain rate. Therefore, vortex separators have very definite limitations.

The present invention overcomes the above difficulties by providing an anti-vortex gas-liquid separator which is compartmentalized for stabilizing the liquid flow and eliminating high speed streams of gas-carrying liquid for purposes of slowing the liquid flow to the extent that the density effect of the air bubbles in the water provides a natural separation of the gas from the liquid.

The separator comprises an inlet passage opening into a first compartment of increased volume for reducing liquid flow speed. Provided in the first compartment is an impact surface for providing a back pressure on liquid flowing from the inlet passage and for reversing the liquid flow direction. Anti-vortex means is provided for impeding the liquid flow path and for suppressing flow vortex resulting from the reversal in liquid flow direction. The separator includes a second compartment of increased volume for a stable, slow uniform flow of stream-free liquid. The second compartment is separated from the first compartment by the anti-vortex means. A venting outlet for the escape of the separated gas and a liquid outlet in the second compartment for the outflow of gas-free liquid are also provided.

BRIEF DESCRIPTION OF THE DRAWINGS

Other features of the present invention will also become apparent from the following detailed description of the preferred embodiments according to this invention, wherein:

FIG. 4 is a sectional view taken through a second arrangement of an air liquid separator according to this invention;

FIG. 5 is a sectional view taken along the lines 5—5 of FIG. 4;

FIG. 6 is a sectional view taken along the lines 6—6 of FIG. 4;

DETAILED DESCRIPTION OF THE PREFERRED EMBODIMENTS ACCORDING TO THIS INVENTION

Figure 1:
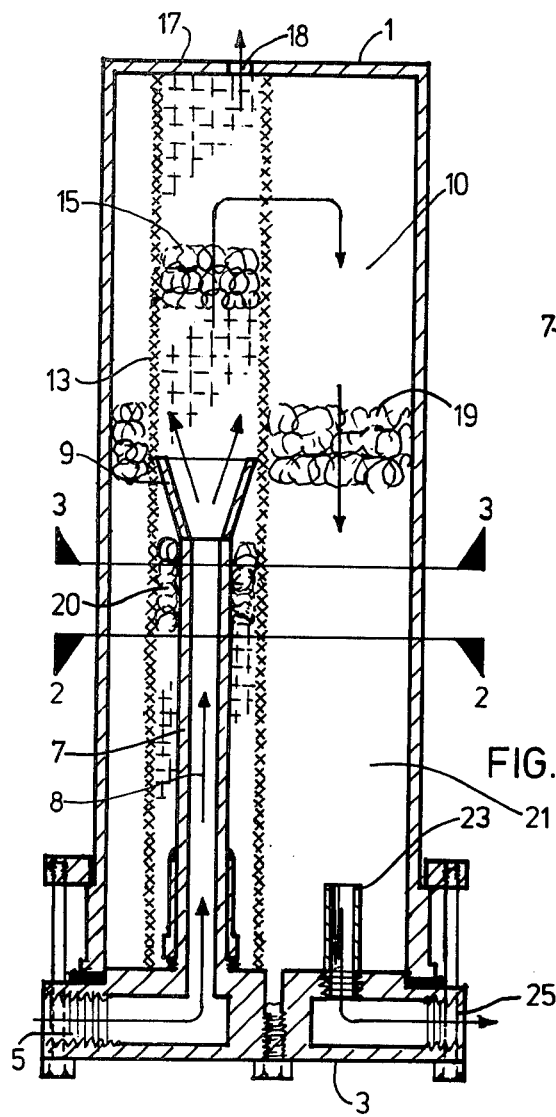
FIG. 1 is a sectional view taken through a first arrangement of an air liquid separator according to this invention.
Figure 3:
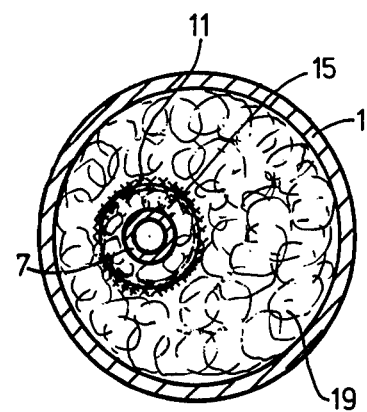
FIg. 3 is a sectional view taken along the lines 3—3 of FIG. 1.
Figure 2:
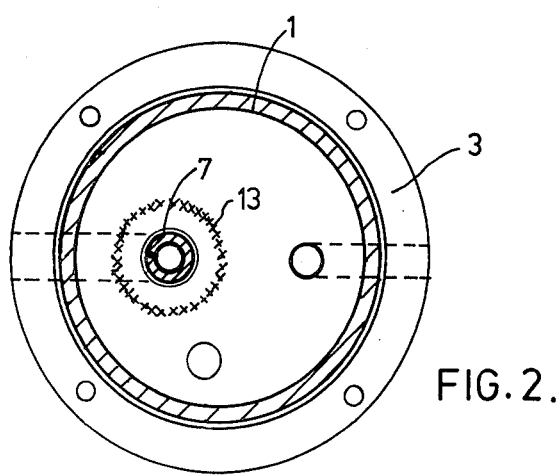
FIG. 2 is a sectional view taken along the lines of 2—2 of FIG. 1.

FIGS. 1 through 3 show a gas-liquid separator unit comprising an end portion 3 and a cannister 1 removably secured to the end portion. This particular unit may be inserted directly in the pipeline or as a by-pass of a closed hot water heating system. The water flowing through the system enters the separator through orifice 5 on the positive side of the separator or the side from which the water is being pushed into the separator. This water containing trapped air bubbles is forced at high speed through extended inlet piping 7 in the direction of arrows 8. Provided at the interior end of piping 7 is an outwardly funnelled portion 9 from which the water flows into first compartment 10 of increased volume relative to the inlet piping. It should also be noted that the funnelled end 9 of piping 7 is also increased in volume relative to the inlet piping.

Screen guiding means 13 is wrapped about the piping and its funnelled end and extends the length of cannister 1. The screen guiding means consists of layers of screening material wrapped about one another.

Anti-vortex means 15 which is preferably of wool mesh material is provided in the screen guiding means directly in the path of the liquid flowing from the inlet piping.

A second anti-vortex means 19 which is constructed from the same material as anti-vortex means 15 divides the cannister to provide a second compartment 21. The venting outlet 18 for the escape of separated gas is provided in the first compartment while the liquid flow outlet 23 is provided in the second compartment. Water flowing from the separator flows out exit port 25 which is provided on the suction side of the pump.

Also provided in the second compartment is a third anti-vortex wool mesh 20 wrapped about the outer surface of the inlet piping in the screen guiding means.

The separator unit of FIG. 1 is inserted vertically in a pipeline as shown in the drawings with the first compartment being located above the second compartment. It will be noted that the upper end of liquid outlet 23 is spaced from the bottom of the second compartment.

The principle of operation of the separator according to the present invention is to stabilize the liquid flow to the extent that there is a tranquil uniform flow of greatly reduced speed such that the relative densities of the air bubbles and the water become the dominant factors and permit the releasing of the air bubbles in an upward direction from the water and through the escape vent 18. This principle of operation is fulfilled by forcing the water carrying the bubbles at high speed through the inlet port 5 and up piping 7 which imparts an upward velocity to the air bubbles. As the water leaves the funnelled end 9 of the piping, it is subjected to a compartment of substantially increased volume which in combination with the weight of the water, reduces the liquid flow speed while the air bubbles continue their rapid upward travel. At the same time, part of the flow is directed outwardly at the screen guiding means which encourages the air or gas bubbles to unite when they come into contact with its coarse surface. Bubble uniting and consequent enlargement occurs when the bubbles contact one another due to the flow resonance as affected by the abrasive action of the coarse screen surface. In addition, the layering of the screen means form flow tubes for the upward travel of the entrapped bubbles to the venting outlet. Therefore, as the water easily passes through a large surface area of the screen into the enlarged, relatively complacent compartment 10, the air bubbles are trapped in the screening due to its filtering and guiding action. Furthermore, the screen acts as an abrasive against any possible flow vortex within its confines resulting from the outward funnelling at the outlet end of the inlet piping.

The central flow passing from the inlet piping which is not subjected to the screen guiding means moves along a more vertical path and is forced through wool mesh 15. This wool mesh also acts as an anti-vortex means and impedes the flow path of the liquid to further reduce the flow speed. Again the abrasive surface of the wool mesh acts as an air bubble filter in which the microscopic bubbles unite to form larger bubbles.

Liquid flowing through the wool mesh continues its upward travel until it impacts against the end 17 of the cannister. This impact surface further enhances the tendancy of the bubbles to unite and in combination with the wool mesh provides a back pressure on the liquid flowing from the inlet piping.

After the liquid has impacted against end surface 17 or any trapped liquid providing the back pressure, the liquid flow direction is reversed. However, at this point, the liquid is moving so slowly that the air bubbles separate because they are much lighter than the water and they continue their upward movement within the screen guiding means to the escape vent.

As the essentially bubble-free water moves downwardly under its own weight and through the suction of the pump, it passes through anti-vortex wool mesh 19 into the second enlarged compartment 21. The anti-vortex wool mesh acts as an insurance against any possible entrance of air bubbles into the second compartment and essentially eliminates all turbulences and streaming in the flow patters so that the water in the second compartment moves at a slow uniform speed and flows outwardly through the liquid outlfow 23 and the outlet port 25 to the system pipes. It should be noted that the anti-vortex mesh 19 is located such that water flowing out of the inlet passage cannot enter directly into the second compartment.

The provision of third anti-vortex wool mesh 20 stabilizes any upward flow of water along the sides of the inlet passage which might otherwise initiate streaming in the second compartment.

The positioning of the liquid outlet spaced from the bottom of the second compartment prevents any slag, which has settled on the bottom of the separator, from escaping with the bubble-free liquid. When it becomes necessary, the unit can be easily disassembled to remove the collected slag.

FIGS. 4 through 6 show a second separator unit arrangement consistng of an end portion 30 and a cannister 32 removably secured to the end portion and housing the internal elements of the separator. In this arrangement, the unit is inserted directly in the system or as a by-pass with the cannister being located in the downwardly extending position.

Housed within cannister 32 is inlet piping 36 opening into divided cup 40. The inlet piping and cup are again surrounded by layers of screen material 44. Provided in the screen guide, wrapped around the outer surface of the inlet pipe above the cup, is wool mesh 46. Located directly below the cup in the screen guide is wool mesh 54. A third wool mesh 50 divides the cannister into first compartment 48 and second compartment 52 of increased volume relative to the inlet pipe. Liquid flow outlet 56 spaced from the bottom of the cannister is provided in the second compartmet and gas bubble vent 55 is provided in the first compartment.

The principle of operation of this unit is identical to that described with respect to FIGS. 1 through 3, i.e., to stabilize and eliminate high speed liquid flow and any streaming or turbulence in the liquid flow.

The bubble-carrying liquid flows at high speeds through inlet port 34 and down inlet passage 36 into cup 40 where it impacts against the base 42 of the cup. The liquid flow direction is reversed upwardly within the screen guide 44 which acts as both a bubble filter for water escaping through the screen and as a means for suppressing any flow vortex resulting from the reversal of flow direction. It should be noted that wool mesh 50 is positioned to preclude water flowing directly from the cup into the second compartment 52 without passing through the wool mesh.

The water which does not escape through the screen guide is forced upwardly to wool mesh 46 impeding the liquid flow path and reducing the liquid flow speed. Wool mesh 46 essentially eliminates all vortexing within the screen guide and again acts a bubble collector and uniter. As the water flows through the screen it is essentially bubble free with the separated bubbles being trapped within the screen guide where they are united to form bubbles significantly larger than those carried into the unit with the liquid flow. The weight of the water carries it downwardly in uniform slow motion through wool mesh 20 and into the second compartment 52 while the air bubbles, which have been imparted with a high velocity upwardly often impacting the base of the cup, climb quickly to escape through vent 55. Wool mesh 50 eliminates essentially all streaming and turbulence of the liquid in the second compartment. The bubble-free liquid then flows through outlet 56 and out port 58 provided on the suction side of the pump. It should be noted that outflow 56 is spaced from the bottom of the cannister such that slag settling in the cannister is trapped and will not flow through the separator. The cannister can then be removed for cleaning purposes. In addition, this unit is particularly useful as a port feeder for inserting chemicals directly into the pipeline.

Wool mesh 54 provided in the screen guide at the base of the cup stabilizes any upward pull which might otherwise initiate streaming in the second compartment.

Figure 8:
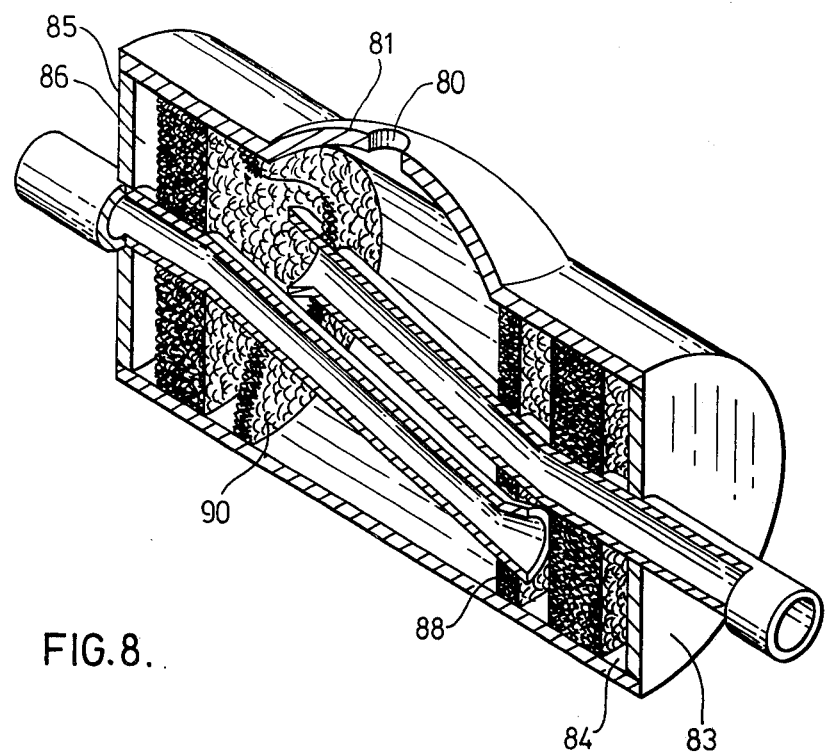
FIG. 8 is a sectional view of a similar model slightly modified from that shown in FIG. 7.
Figure 7:
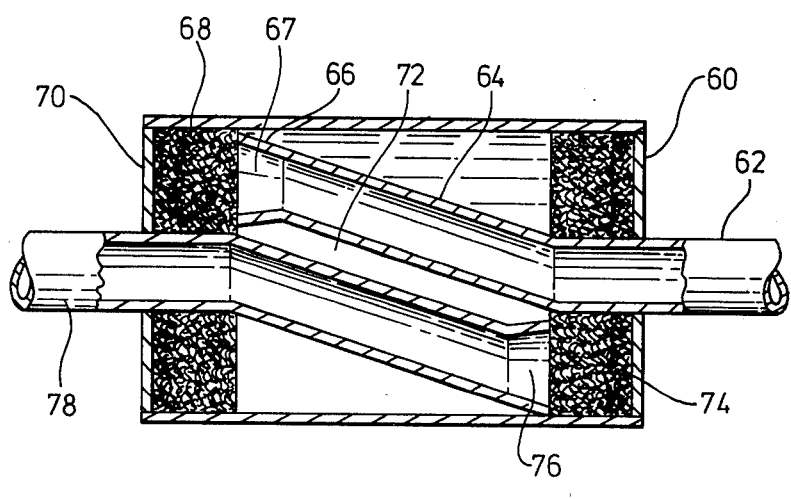
FIG. 7 is a sectional view looking down on a third arrangement of an air liquid separator according to this invention.

The gas-liquid separators shown in FIGS. 7 and 8, are constructed such that they are effective for direct installation in a closed pipe system regardless of their direction of installation. This is an important feature of these particular units because it is often difficult to determine flow direction in a blocked zone. Furthermore, when the system is shut down, as required during installation, there is no indication as to the direction in which the water is flowing.

Each of the units shown in FIGS. 7 and 8 are compartmentalized and include means for slowing fluid flow and eliminating streaming within the fluid flow so that their principle of operation is identical to the abovedescribed units.

The separator shown in FIG. 7 can be installed in a hot water heating system with the water flowing in eigher a left to right or a right to left direction and effective in both cases. In a situation where there is right to left flow the unit operates as follows: water is forced through inlet port 62 by the pump and out the funnelled end 66 of inlet piping 64. The area between the end wall 70 of the separator and the funnelled end of the inlet piping forms a first compartment generally indicated at 67 divided from second compartment 72 by wool mesh 68.

The flow speed of the gas-carrying liquid is reduced at the funnelled end of the inlet piping as a result of the increase in volume in compartment 67. The liquid is immediately subjected to wool mesh 68 which acts as a bubble filter and an anti-vortex to liquid flowing from the funnelled end 66. It is also positioned directly in the liquid flow path.

The liquid flowing through the wool mesh immediately impacts against the end wall 70 and the flow direction is reversed back into the separator such that the liquid once again passes through the wool mesh prior to entering second compartment 72. Both the wool mesh and the end wall provides a back pressure to liquid flowing from the inlet piping.

The flow of the liquid through the wool mesh in both directions and the impacting of the liquid on the end wall of the separator tends to unite and collect essentially all of the gas bubbles carried in the liquid. These bubbles are guided upwardly through the mesh to the venting means which cannot be seen in FIG. 7 but which is identical to that shown in FIG. 8. The liquid flowing in second compartment 72 of substantially increased volume is moving at a slow uniform speed without streaming or turbulence.

From the second compartment the fluid must flow through a further wool mesh 74 to the outflow 76 ad the gas-free liquid then flows out port 78 on the suction side of the separator.

As can be seen from the drawings, ports 62 and 78 are located centrally of the separator and if the separator were reversed or the direction of liquid flow were left to right, the unit would still be effective with wool mesh 74 providing the impedance between the first and second compartments and end wall 60 providing the impact surface for uniting bubbles and reversing the flow direction.

The unit shown in FIG. 8 is basically the same as that shown in FIG. 7 with the exception that compartments 84 and 86 are provided adjacent respective end walls 83 and 85 of the separator and additional wool meshes 88 and 90 are provided to divide the enlarged interior compartment into sub-compartments. The provision of venting outlet 80 an concave roof 81 are provided in the enlarged interior sub-compartment which is consistent in both the units shown in FIGS. 7 and 8. The particular shape of the roof of this separator provides even greater volume in the interior compartment to assure a more reduced liquid flow and to provide a bubble trap form which the separated gas is directed to the venting outlet.

Another advantageous feature of the separator shown in FIGS. 7 and 8, is that it can be used a gas-liquid separator for separating liquid from a flowing gaseous medium by simply placing it upside-down such that the liquid trapped by the wool mesh flows out the escape vent.

The size of all of the units described above is completely variable although a highly critical feature is the provision of a volume increase in the interior of the separator to assure a relative slowing of the liquid flow pattern. Therefore, the unit can be made in a very compact model which is especially useful for installation directly into a pipe system and capable of handling flow rates within the system or it can be made into a much larger unit capable of handling much higher flow rates.

Although various preferred embodiments of the invention have been described herein in detail, it will be appreciated by one skilled in the art that variations can be made thereto without departing from the spirit of the invention or the scope of the appended claims.

What I claim is:

1. An anti-vortex gas liquid separator which is compartmentalized for eliminating high speed streams of gas-carrying liquid and comprising said gas liquid separator having an inlet passage opening into a first compartment of increased volume for reducing liquid flow speed, an impact surface in said first compartment for providing a back pressure on liquid flowing from said inlet passage to further reduce the liquid flow speed and for reversing the liquid flow direction, anti-vortex means for impeding the liquid flow path and for suppressing flow vortex resulting from the reversal in liquid flow direction, a second compartment of increased volume for the slow uniform flow of stream-free liquid, said second compartment being separated from said first compartment by said anti-vortex means, a venting outlet for the escape of separated gas and a liquid outlet in said second compartment for the outflow of gas-free liquid.

2. An anti-vortex gas-liquid separator which is compartmentalized for eliminating high speed streams of gas-carrying liquid and comprising said gas liquid separator having an inlet passage funnelled outwardly at its downstream end to provide a first compartment of increased volume for reducing liquid flow speed, an impact surface in said first compartment for providing a back pressure on liquid flowing from said inlet passage to further reduce the liquid flow speed and for reversing the liquid flow direction, first anti-vortex means between said funnelled end and said impact surface and separating said impact surface from a second compartment of increased volume for the slow uniform flow of stream-free liquid, said first anti-vortex means for impeding the liquid flow path from said inlet and for suppressing flow vortex resulting from the reversal of liquid flow direction, a venting outlet in said separator for the escape of the separated gas, and a liquid outlet in said second compartment for the outflow of gas free liquid.

3. A gas-liquid separator as claimed in claim 2, including a second anti-vortex means in the second compartment dividing said second compartment into a first sub-compartment bounded by said first and second anti-vortex means and a second enlarged interior sub-compartment, said venting means being provided in said second sub-compartment.

4. A gas-liquid separator as claimed in claims 2 or 3, wherein said first anti-vortex means fills the space between the inlet passage funnelled end and said impact surface.

5. A gas-liquid separator as claimed in claims 2 or 3, wherein said first anti-vortex means is spaced from said impact surface.

6. A gas-liquid separator as claimed in claim 3, for use in a closed hot water heating system, and being provided at each end with a central opening and a length of piping extending into the separator from each opening, each length of piping having an outwardly funnelled free end within said separator covered by an anti-vortex wool mesh which separates it from an opposing end wall of the separator thereby making the separator effective regardless of its direction of installation in the system.

7. A gas-liquid separator as claimed in claims 1 or 2, wherein said anti-vortex means consists of a wool mesh.

8. A gas-liquid separator as claimed in claim 1, wherein said inlet passage consists of a length of piping funnelled outwardly at its free end and wherein said impact surface is provided by an end wall of said separator opposing the free end of the piping for reversing the flow direction from said inlet passage; said separator further including screen guiding means surrounding said free end and forming a channel to said opposing end wall, and second anti-vortex means in said channel; said screen guiding means and second anti-vortex means suppressing flow vortex and flow streaming in said channel.

9. A gas-liquid separator as claimed in claim 8, wherein said screen guiding means consists of layers of screening material and extends along the length of said piping and including a third anti-vortex means wrapped about the outer surface of said piping within the confines of said layers of screening for reducing upward high speed streaming of flow along the outer surface of said piping in said screen guiding means.

10. An anti-vortex gas-liquid separator which is compartmentalized for eliminating high speed streams of gas-carrying liquid and comprising said gas liquid separator having an inlet passage extending into enlarged cup means presenting an impact surface for providing a back pressure on liquid flowing from said inlet passage to reduce the liquid flow speed and for reversing the liquid flow direction, said cup means opening into a first compartment of increased volume, screen guiding means surrounding said cup and extending along the length of said inlet passage spaced therefrom, first anti-vortex means in said screen guiding means for impeding the liquid flow path, said first anti-vortex means and screen guiding means for suppressing flow vortex resulting from the reversal in liquid flow direction, a second compartment of increased volume for the slow uniform flow of stream-free liquid, second anti-vortex means separating the first and second compartments and for providing an impedance against liquid flowing directly from said cup means into said second compartment, a liquid outlet in said second compartment for the outflow of gas-free liquid and a venting outlet in said first compartment for the escape of separated gas.

11. A gas-liquid separator as defined in claim 10, wherein said screen guiding means extends the entire length of said separator through said first and second compartments and third anti-vortex means in said screen guiding means adjacent the base of the cup means in said second compartment.

12. A gas-liquid separator as claimed in claim 11, wherein said first, second, and third anti-vortex means consist of a wool mesh material and said screen guiding means consists of layers of screening material.

13. A gas-liquid separator as defined in claims 9 or 11, wherein said separator consists of an end portion and a cannister removably secured thereto, said cannister housing the components in said separator with said second compartment being located below said first compartment, said liquid outlet being spaced from the bottom of said second compartment such that said cannister is a slag collector and pot feeder.

* * * * *